Oct. 16, 1956  F. SCHAUB ET AL  2,766,534
METHOD AND APPARATUS FOR TREATING GRANULAR MATERIALS WITH GASES
Filed Feb. 17, 1954  11 Sheets-Sheet 8
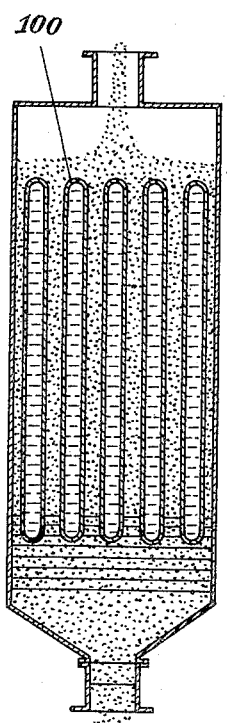
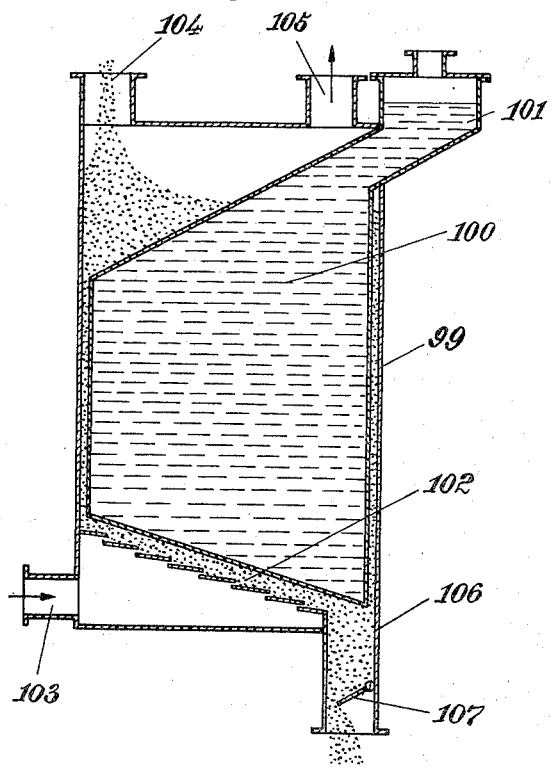
Inventors
Franz Schaub
Heinrich Tramm
By Burgess & Dinklage
Attorneys Oct. 16, 1956   F. SCHAUB ET AL   2,766,534
METHOD AND APPARATUS FOR TREATING GRANULAR MATERIALS WITH GASES
Filed Feb. 17, 1954   11 Sheets-Sheet 10

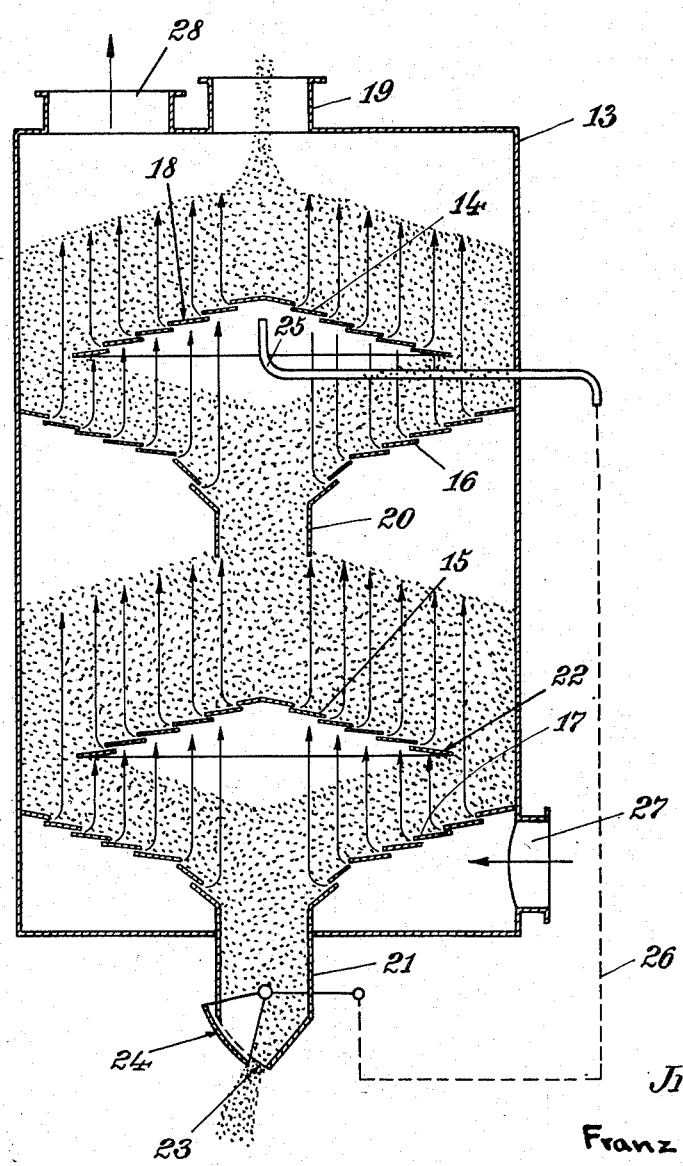

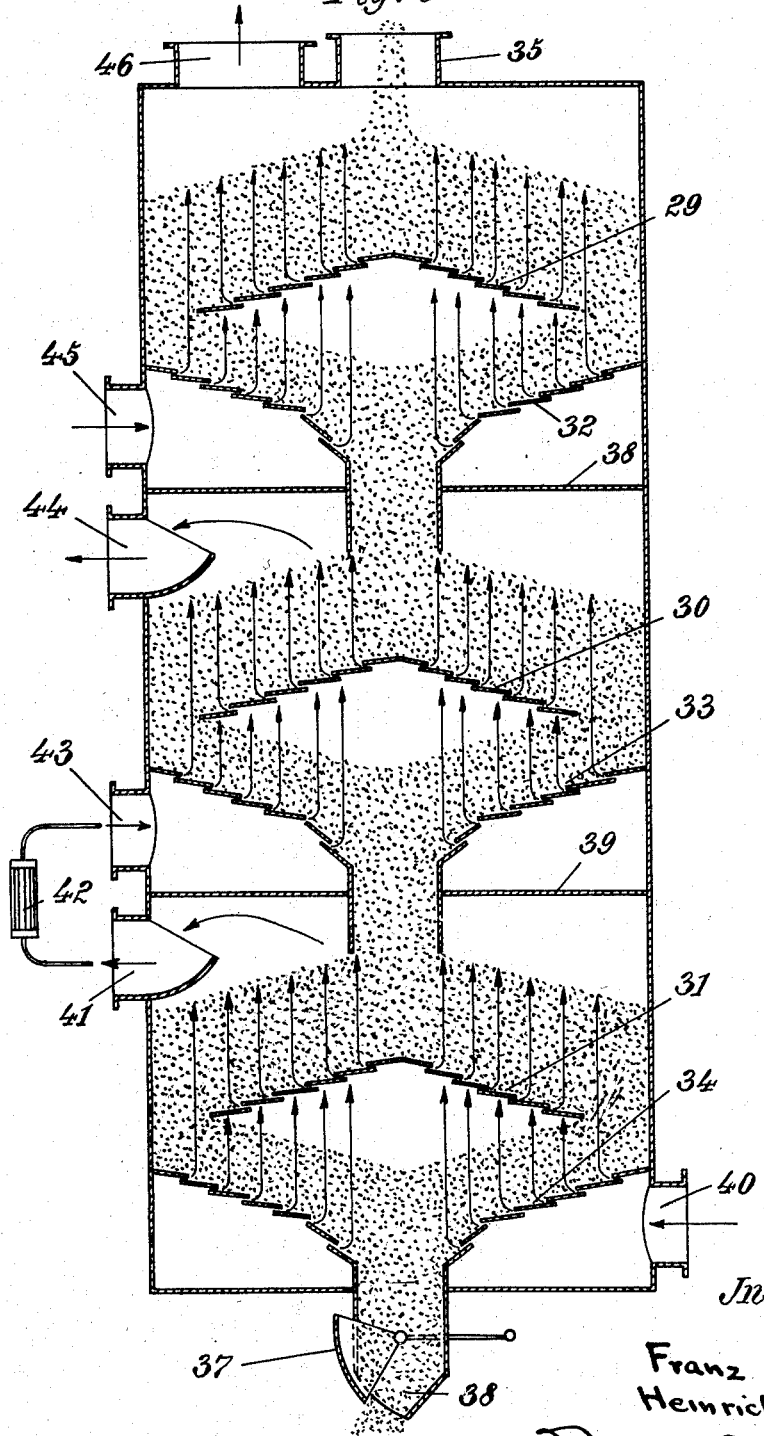

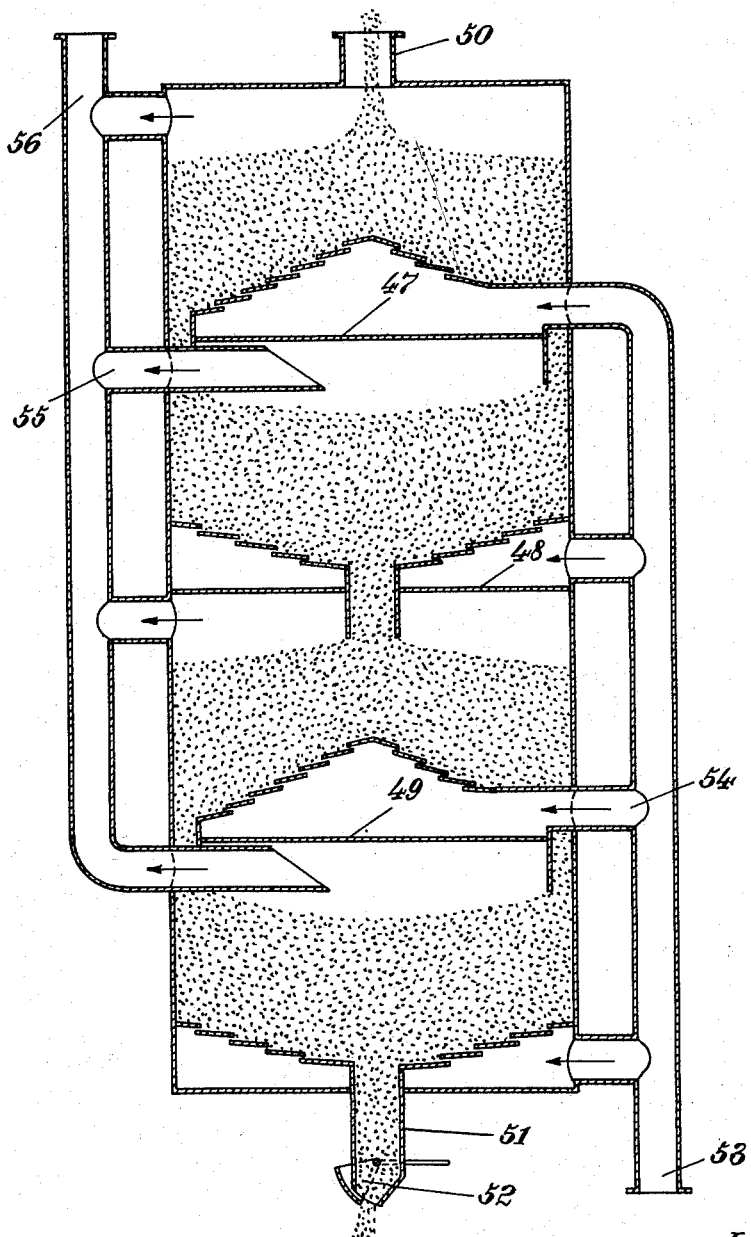

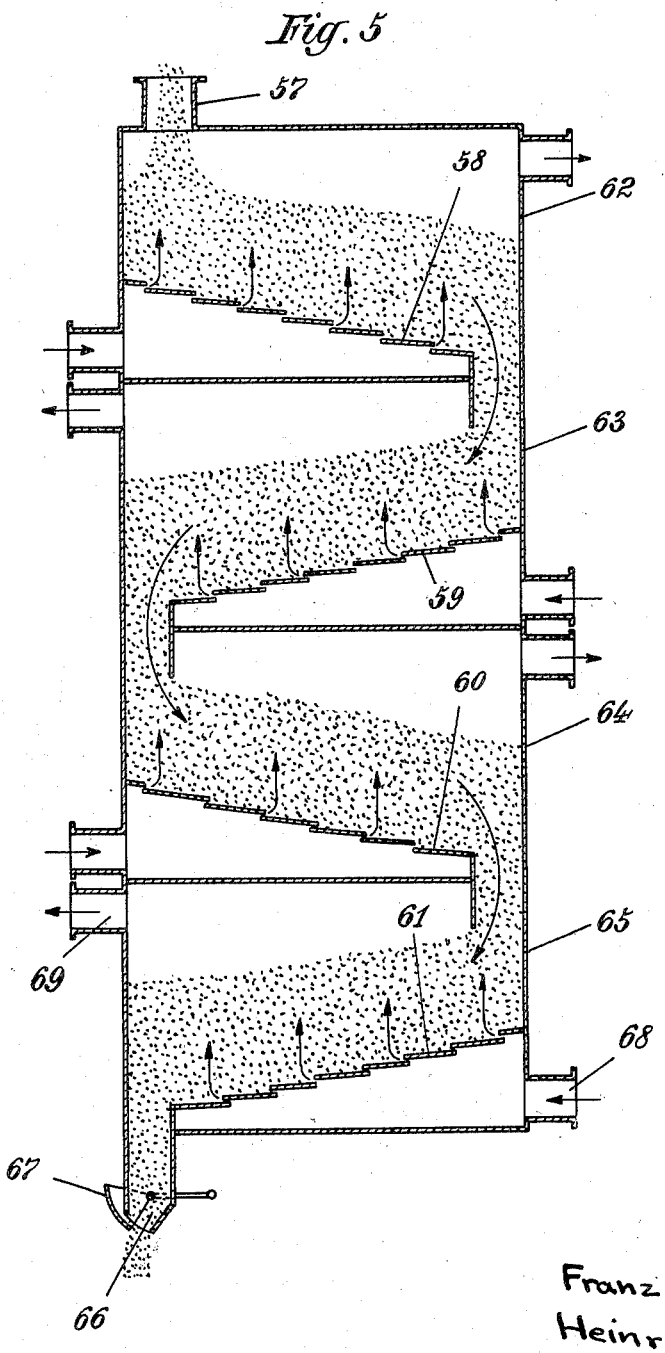

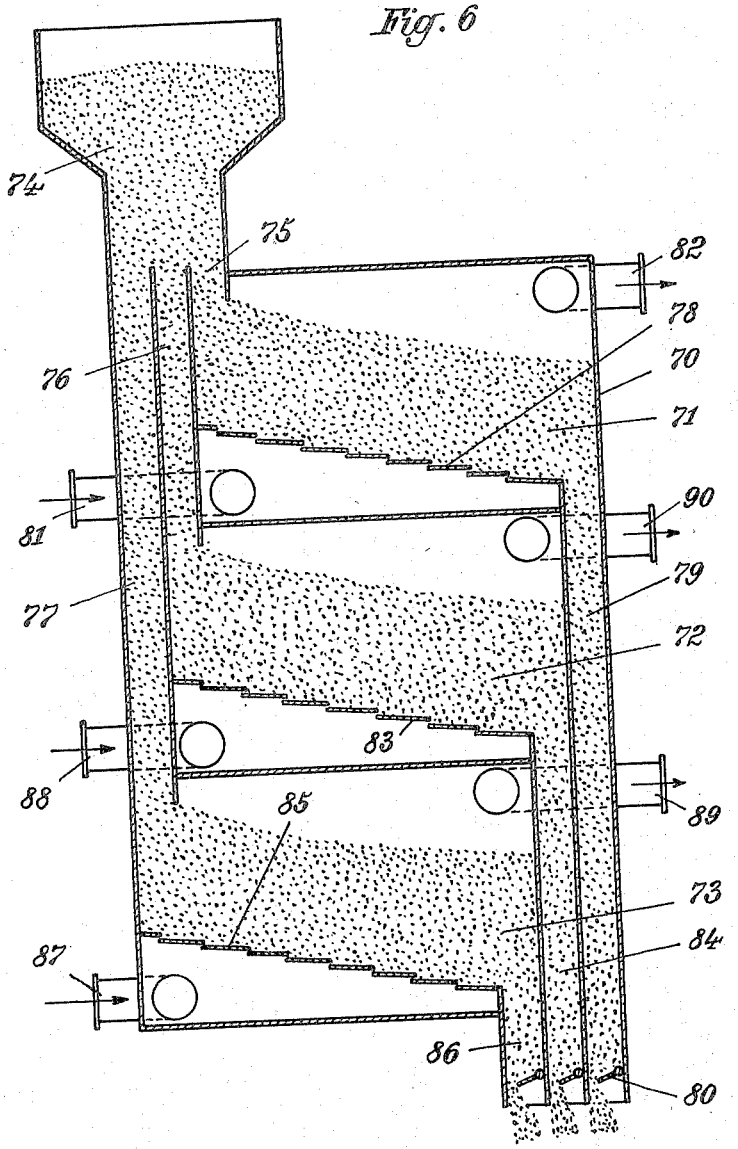

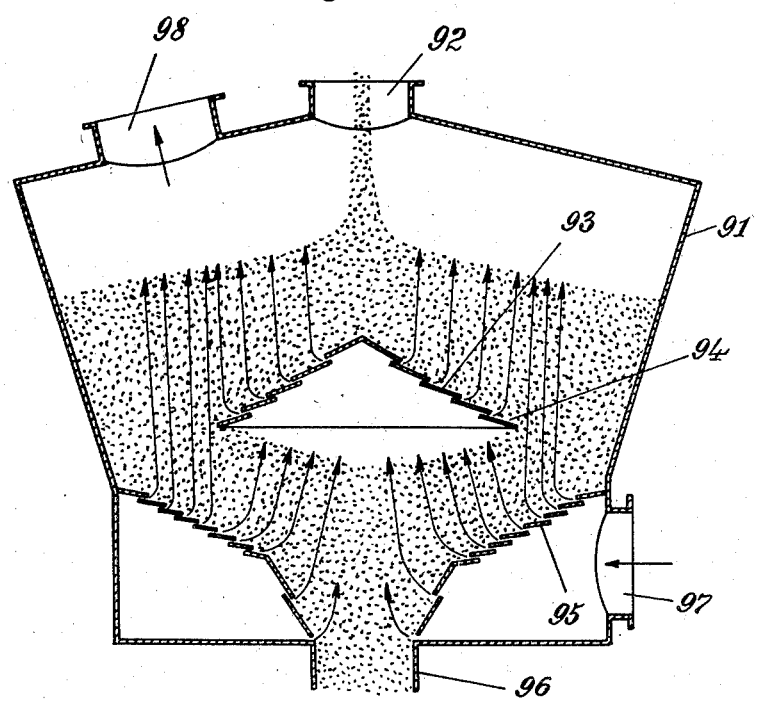

INVENTOR
FRANZ SCHAUB
HEINRICH TRAMM

BY Burgess & Dieklage

ATTORNEYS

Oct. 16, 1956  F. SCHAUB ET AL  2,766,534
METHOD AND APPARATUS FOR TREATING GRANULAR MATERIALS WITH GASES
Filed Feb. 17, 1954  11 Sheets-Sheet 11

INVENTOR
FRANZ SCHAUB
HEINRICH TRAMM

BY
ATTORNEYS

2,766,534

METHOD AND APPARATUS FOR TREATING GRANULAR MATERIALS WITH GASES

Franz Schaub, Oberhausen-Holten, and Heinrich Tramm, Mulheim an der Ruhr, Speldorf, Germany, assignors to Ruhrchemie Aktiengesellschaft, Oberhausen-Holten, Germany, a corporation of Germany Application February 17, 1954, Serial No. 410,889

Claims priority, application Germany October 1, 1948

17 Claims. (Cl. 34—33)

This invention relates to improvements in the method and apparatus for treating granular materials with gases, and more especially, to the industrial application of air and other gases for the cooling, drying, or other treatment of such materials by the passage of gases therethrough. This application is a consolidation and continuation in part of our U. S. patent applications Serial No. 211,768, filed Feruary 17, 1951 and No. 109,186, filed August 6, 1949, both abandoned.

It is conventional procedure to bring granular materials such as salts, fertilizers, ores, and catalysts into contact with gases for various different purposes during processes for the production of such material. For example, moist masses are often dried by the application of hot gases. In addition, products still hot from their production are cooled by contact with cold gases. The gases are combined with solids, as in the case of nitrogen being combined with calcium carbide to produce calcium cyanamide or with carbon dioxide combined with catalysts of high activity acting as a protective medium. Furthermore, in the production of acetylene on an industrial scale, calcium carbide must be treated with water vapor (steam) in such a manner that the resulting calcium hydrate is not muddy, but rather forms a dry pulverulent product. Also, in the operation of smoldering or roasting processes, the materials under treatment are frequently subjected to chemical decomposition by the action of hot gases thereon.

The satisfactory contacting of granular material with gases is rendered difficult by the fact that it is not a simple feat to so distribute a gas over a continually moving flow of solid matter so as to obtain a final product uniform in physical and chemical properties.

One object of this invention is a method for the treatment of granular materials with gases with a substantially better interaction between the treating gases and the granular material. This, and further objects, will become apparent from the following description read in conjunction with the drawings, which show diagrammatic vertical sections, and in which:

Fig. 2 shows treating apparatus having four sloped grid surfaces;

Fig. 3 shows an apparatus having multiple grid sections and multiple gas chambers;

Fig. 4 shows an apparatus having multiple grids;

Fig. 5 shows another embodiment of a gas-treating apparatus having multiple gas chambers and multiple grid surfaces arranged in the form of inclined planes;

Fig. 6 shows a gas-treating apparatus having multiple gas chambers, grid surfaces in the form of an inclined plane and arranged for treating the granular material in a single gas passage;

Fig. 7 shows an apparatus for treating granular substances with gases having conically-shaped grid plates, and a gas chamber which widens toward the top;

Fig. 8 shows a front section of an apparatus for treating granular materials with gases which has heating or cooling means;

Fig. 9 shows a side section of the apparatus shown in Fig. 8;

Figure 11:
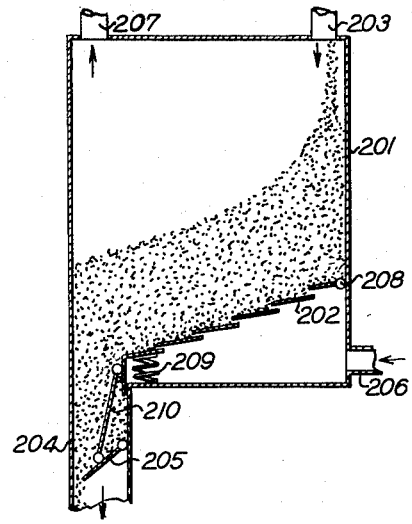
Figure 12:
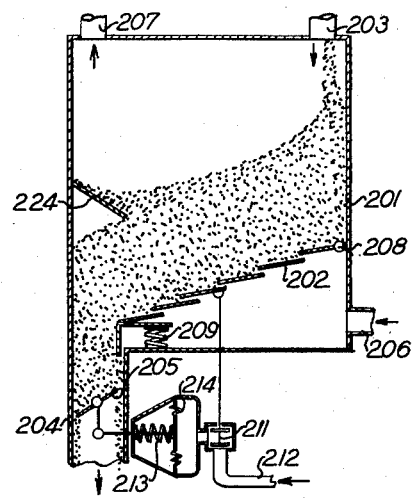
Figure 13:
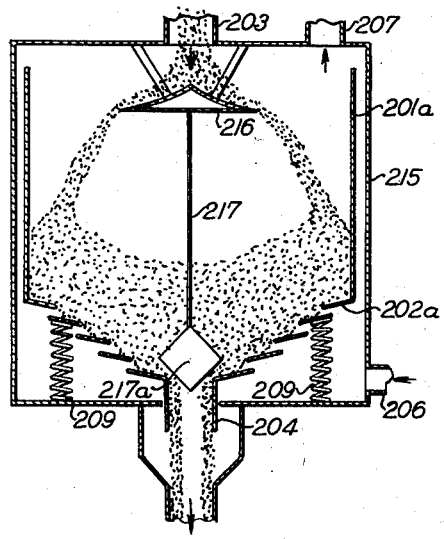
Figure 14:
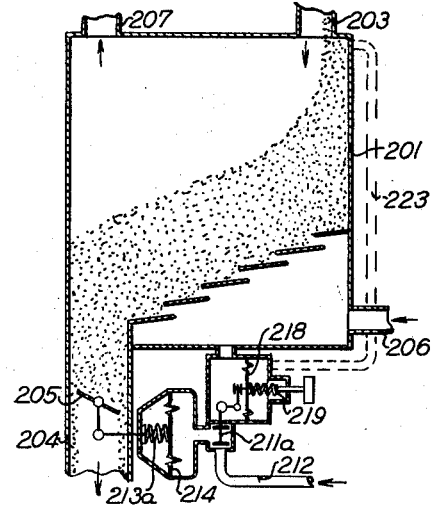
Figure 15:
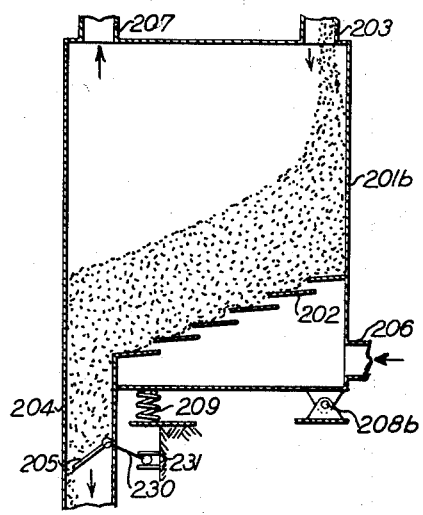
Figure 16:
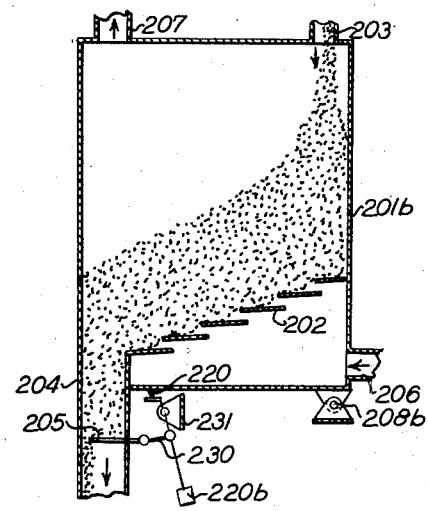
Figure 17:
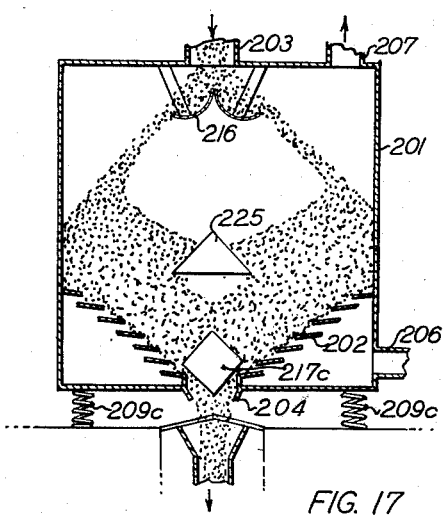
Figure 18:
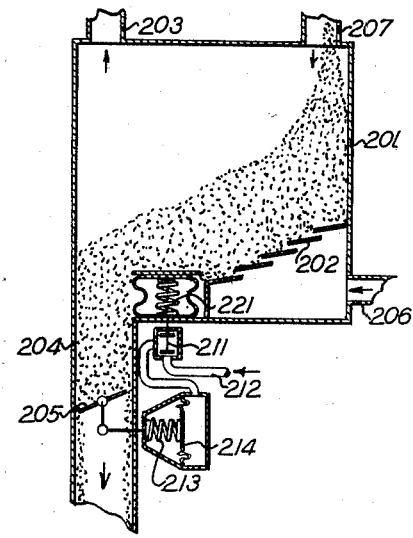
Figure 19:
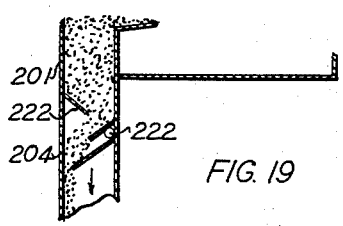

Figs. 11, 13, 15, 16, and 17 are devices for treating granular substances with gases, showing the discharge opening for the granular substance as being adjusted by the weight of the granular substance passing through the device with the aid of mechanical control elements;

Fig. 11 shows the bottom end of the treating zone connected to the discharge throttle by a link which controls the position of the discharge throttle;

Fig. 12 is a device for treating granular substances with gases showing a pneumatic adjusting device for the discharge opening which is controlled by the weight of the granular substance under treatment;

Fig. 13 shows a container with a central discharge opening controlled by a valve body;

Fig. 14 is a device for treating granular substances with gases showing the pneumatic adjustment of the discharge opening being dependent upon the damming pressure of the treating gas;

Figs. 15 and 16 show devices in which the entire container is supported for pivotal movement;

Fig. 17 shows a device in which the container rests on springs and is free for vertical movement;

Fig. 18 is a device for treating granular substances showing a discharge throttle pneumatically controlled by the surface pressure of the material; and Fig. 19 shows a discharge opening showing baffles arranged thereabove to cut down on the resistance to movement of the discharge throttle.

It has been found, according to the invention, that a substantially better interaction by the treating gases and the granular substances to be treated can be obtained if the flow velocity of the gas is increased to such an extent that the pressure which the granular material exerts on its flow support is noticeably reduced, without, however, being reduced to such an extent that the material completely passes into an eddying condition. The pressure due to the weight must, in this connection, be reduced by more than 50% and less than 100%. The flow velocity of the gas may, however, also be increased to such an extent that the pressure exerted by the weight of the downward travelling material is almost entirely cancelled, i. e., approaching a 100% cancellation. A complete cancellation of the weight of the material, as used, for example, in "fluidized catalyst processes," must be avoided, however, inasmuch as in that case the downward directed travel of the material ceases, or may no longer be technically controlled. By a partial, although preferably almost a complete, cancellation of the weight of the material, in accordance with the present invention, i. e., a pressure reduction of more than 50%, and preferably approaching, but not quite 100%, a very favorable flow property of the material results. In this way a particularly flat flow angle is obtained, which assures favorable interaction between the solid and gaseous constituents without the material being carried to the top or prevented from properly discharging at the bottom by the gas flow.

The method in accordance with the present invention is applicable to the most varied kinds of raw materials and to many different treatments of material in addition to cooling and drying. In this connection there may be obtained physical, as well as chemical, effects. From the large number of possible uses there may, for example, be mentioned the following: heating, drying, oxidizing, cooling, dusting or aerating of minerals, ores, coal fertilizers, salts, dyestuffs, oil seeds, grains, chaff; treatment of fruit, vegetables, sliced vegetables, sliced potatoes, malt, fruit seeds, wooden, plastic or metal shavings; burning, roasting or sintering of lime, gypsum, cement, minerals; gas addition reactions, for example, the addition of ammonia to phosphates, and nitrogen to calcium carbide; absorption processes, for example, the desulfurizing of gases by granular desulfurization substances, the removal of carbon dioxide by granular calcium hydroxide, filtration and purification of gases with dust-retaining granular masses or activated substances.

In order to carry out the process in accordance with the present invention, there may be used vessels containing one or more false bottoms provided with perforations to permit the passage of the treating gas therethrough. These false bottoms can be developed in the form of grid-shaped or sieve-shaped plates. The material which is to be treated is passed in some suitable manner from above onto these false bottoms, while the treating gases are blown into the space below the false bottoms. The discharge of the treated material can be effected through an opening arranged between the surface of the false bottoms or may take place at the outer edges of the false bottoms. The use of vertical round treating vessels in which the granular material is introduced at the upper end of the container through a central opening, is particularly advantageous. Immediately below the charging opening, a distribution plate is positioned, which deflects the stream of material toward the side walls of the container. The material falls from the distribution plate onto a funnel-shaped grid surface, through the central opening of which the treated material is removed. The removal of the material may, however, also take place at the periphery of the grid or screen surface.

The layer of material travelling over the grid or screen surfaces must be at least 200 mm. in height. This layer height is preferably controlled by means of the dynamic pressure of the blown-in treatment gases. By means of automatic devices, a constant layer height can be achieved in this manner for the granular material which is to be treated, even in case of a varying feed of the material. Instead of, and in addition to, the dynamic pressure of the treating gases, the resting pressure of the remaining material may also be used to regulate the layer height of the material.

In addition, the material travelling over the grid or screened surfaces must travel under such conditions that the material cannot move in a downward direction over the grate or screen surfaces by purely gravitational force, independent of any gas flow. In order to obtain such a relationship, the angle of slope of the grid or screen surface over which the granular materials move must be maintained smaller than the angle of repose of the particular granular material being treated. In this manner, the granular material may move downward over the grid or screen surfaces only as a result of an effective variation of the angle of repose of this material caused by a rise in pressure due to, for example, the input of gases into the system.

By "angle of repose" is meant the steepest angle of inclination of the surface at which the granular material will remain thereon without sliding down. The angle of repose depends upon the coefficient of friction between a given granular material and the surface over which the material flows.

In order to obtain the best possible utilization of the volume of the receptacle, the distribution of the flow of material entering into the treating receptacle is not effected by means of a simple distribution plate, but the material is rather passed downward, first of all over a concially developed upper false bottom extending practically to the side walls of the treating receptacle and provided with gas passage openings. At the edges of this false bottom, the material passes onto a funnel-shaped grid located below the false bottom and in the center of which there is provided an opening through which the treated material flows down. The treating gases enter at the bottom of the funnel-shaped grid or screen bottom, and first of all flow through the layer of material which is travelling on said bottom. Thereupon they flow through the layer of material entering above the upper conical false bottom. In this way, the treating gases are distributed twice over the flow of material, in which connection a counter-flow process occurs and a particularly good utilization of the gases, both with respect to their temperature and also possibly with respect to their gas constituents, takes place.

The utilization of the treating gases by the downwardly moving material may be even further improved at increased gas velocity if several groups of conical, funnel-shaped or oblique false bottoms are arranged one above the other in a common housing, over which false bottoms the flow of material which is to be treated consecutively passes. One particular advantage of this arrangement is that a regulating device is necessary only below the uppermost conical false bottom, which device controls the admission of further material and regulates the flow of the material.

The individual conical and funnel-shaped false bottoms, arranged in pairs, may be placed in special chambers, in which case, each chamber may be treated with a different gas medium. The gases discharging from from each treating chamber may have their physical or chemical properties changed by an intermediate treatment, for example, cooling, heating or drying, or the addition of further gas constituents, whereupon they are conducted to the next treating chamber. In this manner, a multiple treatment of the flow of material is possible in only a single unit, for example, a drying and cooling of water-containing masses.

In the drawings various devices are shown which are suitable for carrying out the process according to the present invention. In the drawings, similar numerals refer to similar portions in the various embodiments.

Figure 1:
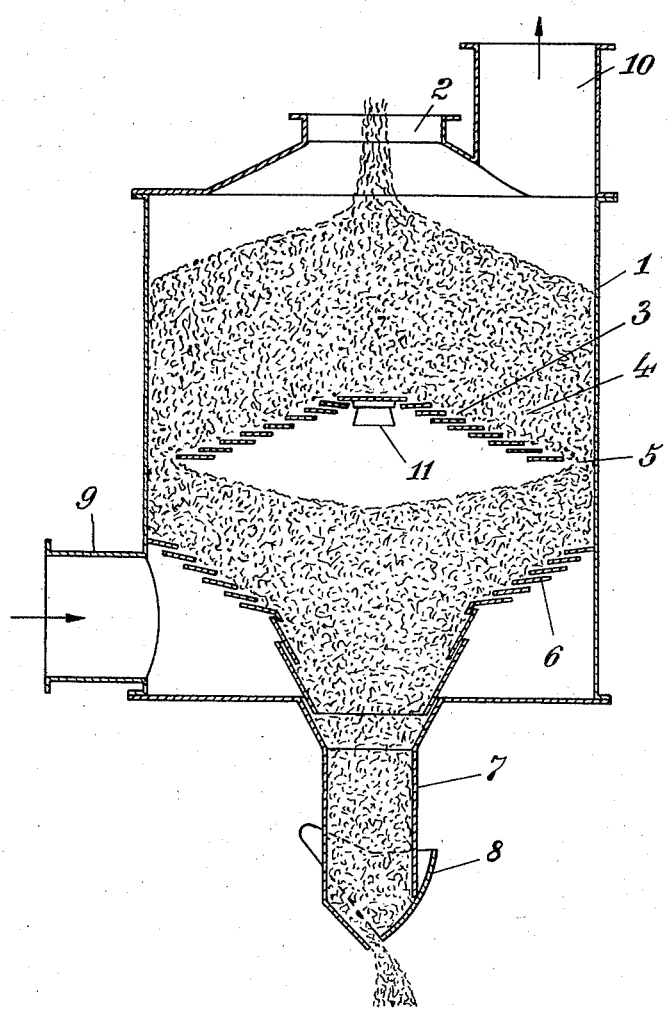
Fig. 1 shows an apparatus for carrying out the method according to the invention having an upper and lower conical grid surface.

In Fig. 1, 1 is a treating vessel having a round cross-section. The granular material which is to be treated is charged through opening 2, located in the upper covering surface. The material first of all drops, within receptacle 1, on to a conical upper grid surface 3, which consists of individual rings or plates 4, staggered one above the other. The treating gases may flow into the material which is to be treated through the intermediate spaces exising between the successive rings. As shown in Fig. 1, the individual plates or rings 4 are horizontal, and the gases flow horiozntally into the material which is to be treated. However, the individual plate may be oblique, and, in that case, the gases are blown into the material with a downward direction.

The lower edge 5 of the conical grid surface is brought rather close to the side walls of receptacle 1. At this place, the flow of material changes direction and drops onto a false bottom provided with gas passage openings located below same. This false bottom consists, for example, of funnel-shaped grid plates 6 arranged one after the other with intermediate slots for the passage of the treating gas. The funnel-shaped false bottom feeds the material into the discharge pipe 7, the opening of which can be closed by a movable control flap 8. The discharge cross-section is adjusted by means of flap 8 to the quantity of material which is to be discharged per unit of time.

The treating gases enter receptacle 1 below the funnel-shaped false bottom through a pipe line 9. They first of all flow between the grid plates 6 of the lower false bottom and pass through the layer of material travelling over said bottom. The greatest part of the treating gases thereupon flows upward between grid plates 4, through the material which is travelling downward on the cone-shaped false bottom 3. The gases, which are in this manner intensively utilized, leave the treating vessel 1 through a pipe line 10 connected to its covering surface.

The upper conical false bottom 3 can be placed by a shaking device 11 into rhythmic movement. This shaking device may, for example, consist of a mechanical vibrator which is connected with a few grid plates 4.

In Fig. 2, there is shown a device suitable for the carrying out of the process according to the present invention and which operates with four superimposed grid surfaces. Within the housing 13 of, for example, rectangular or round cross-section, there are arranged the conical grid surfaces 14 and 15. Below each said conical grid surface, there is arranged funnel-shaped grid surfaces 16 and 17, respectively. All grid surfaces consist of individual annular plates 18, which are arranged staggered one above the other in such a manner that passage openings remain free between them for the treating gases.

The material to be treated is charged at the top of housing 13 through an opening 19. It passes, first of all, onto the uppermost grid surface 14, which conducts it almost to the inner wall 13 of the housing. There the material drops onto a funnel-shaped grid 16, which passes into an opening 20, which conducts the material to the lower, cone-shaped grid surface 15. At its edges 22 the flow of material passes over onto the funnel-shaped grid 17. From here the completely treated material is fed to the discharge pipe 21, the cross-section 23 of the opening of which can be controlled by a movable flap 24. The position of flap 24 is regulated by suitable control members, for example, by a pneumatic device 25, which enters into action at the dynamic pressure prevailing below the uppermost conical grid 14, in which connection this pressure impulse is transmitted to the control means of flap 24 by a transmission line 26. The treating gases enter through a pipe connection 27 on the bottom of treating receptacle 13. They consecutively pass through the layers of material moving downwards on grid plates 17, 15, 16, 14 and leave the apparatus through an opening 28.

In the embodiment according to Fig. 3, the operation is effected with three conical grid plates 29, 30, and 31, and three corresponding funnel-shaped grids 32, 33, and 34. The material to be treated is charged at the top of the apparatus housing through an opening 35 and travels successively over the individual grid surfaces until reaching the discharge opening 36 located at the bottom of the apparatus and provided with an adjustable closusure flap 37.

The individual treatment sections are separated from each other by false bottoms 38 and 39. In this manner, the downward moving material can be treated on its path with different types of gases. For example, a cold flow of gas, which is intended to reduce the temperature of the material, can be blown in through opening 40. After passing through the plate grids 34 and 31, this cooling agent leaves the lowermost treatment section through pipe line 41, and is thereupon cooled in a heat-exchanger 42 located outside the apparatus. Thereupon, it is conducted through pipe line 43, into the central treating chamber. After it has flown there through the layers of material travelling over the grid surfaces 33 and 30, it leaves the treating apparatus through opening 44.

The uppermost treating chamber lying above false bottom 38 is charged with hot gases through pipe line 45. These gases flow through grid surfaces 32 and 29, producing an intensive drying of the material entering through opening 35. The drying gases which are consumed leave the apparatus through an opening 46 provided in its upper cover surface.

The structural height of the treating apparatus for continuously treated granular material, shown in Fig. 3, can be increased to any desired extent, so that a large number of conical and funnel-shaped false bottoms can be provided which are passed through successively by the different gases used for the different sections.

Differing from the structural form shown in Fig. 3, the treating apparatus can be subdivided after each false bottom. Such an arrangement is shown in Fig. 4.

The treatment housing is subdivided into four different chambers by false bottoms 47, 48, and 49. In the uppermost chamber, there is provided a conical grid surface, and, in the next chamber, the corresponding funnel-shaped grid surface. The chamber next below same, in turn, contains a conical grid surface, and, in the lowermost chamber, there is again provided a funnel-shaped grid surface. The material which is to be treated is charged at the top of the apparatus through an opening 50 and then travels, over the different grid surfaces, downward to the discharge pipe 51, the cross-section of the opening of which is controlled by a flap 52. The treating gases can be introduced from pipe line 53 through connection pipes 54 parallelly into each chamber and be discharged therefrom through pipe lines 55. Pipe lines 55 are connected with the main gas-discharge line 58. Each chamber may, however, also be provided with a separate admission and discharge line for different kinds of gases when it is desired to have the treating apparatus carry out different operations on the material passing through.

The material which is to be treated passes from the uppermost chamber, at the edge of the advisedly round cross-section of the apparatus, into the immediately lower chamber. Here it is charged onto a funnel-shaped plate grid which has in its center an opening through which the material passes into the next treating chamber. Depending on the number of superimposed individual chambers, this passage of the material is repeated until the completely treated material can be discharged through pipe line 51.

The material, instead of migrating downwards over conical and funnel-shaped false bottoms, can also move downward over flat, plate-shaped, false bottoms, which slope in one direction and are provided with slots for the passage of the gas and which are arranged one above the other in the form of inclined planes. Such an embodiment of the material-treating apparatus in accordance with the invention is shown in Fig. 5 on the basis of a diagrammatic vertical section through a treating apparatus of rectangular cross-section.

The material which is to be treated enters through an opening 57 at the top of the apparatus. It travels successively over false bottoms 58, 59, 60, and 61, consisting of individual plates arranged in the form of steps above each other, provided in chambers 62, 63, 64 and 65. At the bottom end of the apparatus, the completely treated material is discharged through a discharge opening 66, the cross-section of the opening of which can be varied by means of an adjustable flap 67. The treating gases enter the individual chambers in each case below the plate grids 61, 60, 59, and 58. The treating gases are conducted to the lowermost chamber 65 through a pipe connection 68. At the top of this chamber, the gases discharge through a pipe line 69. The admission and discharge of the gases for treating chambers 64, 63 and 62 take place in the same manner. The inlet and outlet lines of the individual chambers can be connected with each other if it is desired to repeatedly use the gas current. Each chamber may, however, also be operated with different treating gases when the material is to pass successively through different treating sections, for example, a drying, cooling, and dusting section.

If granular materials are treated in one passage in which gas contact is effected, and it is desired to use for this purpose apparatus having the smallest possible base surface, it will be preferable to use the arrangement shown diagrammatically in a vertical section in Fig. 6.

In a housing 70, there are arranged three treating chambers 71, 72, and 73, one above the other. The material which is to be treated is fed to a hopper 74 and distributed from there over three parallel shafts 75, 76, and 77. Shaft 75 conveys the material into the uppermost treating chamber 71, where it travels, over an oblique plate grid 78, to the discharge shaft 79, the discharge cross-section of which is adjusted by a flap 80. The treating gases are conducted to chamber 71 through a pipe line 81 and discharged through pipe line 82. The feed shaft 76 feeds the material introduced into hopper 74 into chamber 72, where it travels, over the plate grid 83, to the discharge shaft 84. In a similar manner, the material which is to be treated is conveyed by an inlet shaft 77 into the lowermost treatment chamber 73, where it passes, over a plate grid 85, to the discharge 86. The gas is admitted to the two lowermost chambers through pipe lines 87 and 88. The gas discharge takes place through pipe-lines 89 and 90.

In the treatment of granular material in accordance with the invention with gases having a sufficiently rapid flow, there can be obtained a particularly favorable utilization and distribution of the treating gases if the treating receptacle widens towards the top in the manner of a funnel. One suitable device for this purpose is shown in vertical section in Fig. 7.

91 is a round container which widens conically towards the top. The material which is to be treated is introduced through an opening 92. Within container 91, it travels in continuous flow first of all over the conical grid surface 93, which consists of individual annular plates. At the lowest plate ring 94, the material passes onto the funnel-shaped grid surface 95, which also consists of individual plate rings. The funnel-shaped false bottom has a central opening 96, through which the treated flow of material is continuously discharged.

The treating gases enter through a pipe line 97. They first first of all flow through the gaps of the funnel-shaped false bottom 95 and the layer of material travelling on same. Thereupon, they pass through the gaps of the conical false bottom 93 and again pass through a layer of the material to be treated. The treating gases, which are in this way utilized twice, leave the apparatus through a pipe line 98.

By means of the conical, upward widening form of the container, there is obtained a greater lift in the lower part of the material layer and a slighter lift in the upper layers. Both counteract the dynamic pressure of the entering gases.

If granular material is subjected, by means of the process in accordance with the present invention, in continuous operation to chemical reactions in which considerable quantities of heat must be added or conducted away, the treating gases suffice for the conducting of the necessary quantities of heat at excessively high temperature differences. Heat exchange-surfaces may be provided within the treating apparatus for contact with the granular material and the treating gases. These heat-exchange surfaces are heated or cooled by liquid, gaseous, or vaporizing media. They must be arranged within the cross-section of the apparatus in such a manner that the most intensive and longest possible contact between them and thin layers of the downward moving material and the treating gases occurs.

The heat-exchange surfaces may, for this purpose, be arranged, in accordance with Figs. 8 and 9, in a rectangular treating vessel 99 in the shape of flat sheet metal pockets 100 parallel to the walls of the receptacle. The intermediate space between the individual sheet metal pockets 100 is kept as narrow as possible, so that the entering material can move downwards in thin layers between them. Outside of housing 99, the sheet metal pockets 100 are connected with a collecting vessel 101, which feeds the heating or cooling agent to them.

The treating gases enter through a pipe connection 103 below plate grid 102. They flow through the material, entering through opening 104, which leaves the receptacle through an opening 105. Due to the gas contacting of the material according to the invention, an intensive heat exchange takes place at the outer surfaces of the sheet metal pockets 100, so that the quantities of heat required or given off by the material which is passing through can be introduced or discharged in a satisfactory manner. The completely treated material is discharged through a pipe line 106, the discharge cross-section of which is controlled by a flap 107.

Figure 10:
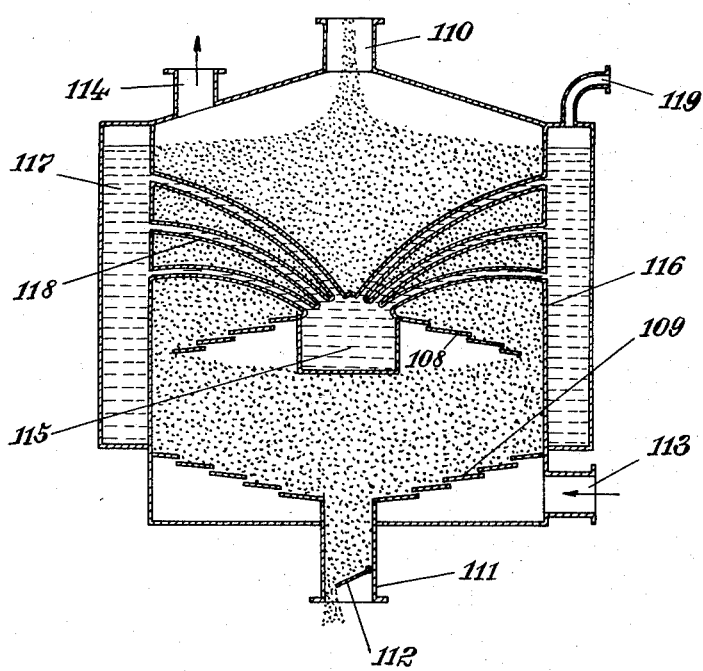
Fig. 10 shows an apparatus for treating granular substances with gases, which has inner heat-exchange surfaces.

In Fig. 10 there is shown a cylindrical treating apparatus having inner heat-exchange surfaces. It operates with two superimposed grid surfaces 108 and 109. The material to be treated enters through an opening 110 and is discharged through a pipe connection 111, the cross-section of the opening of which is controlled by means of flap 112. The treating gases enter through the pipe line 113 and leave the apparatus through line 114.

Within the apparatus, there is arranged a receptacle 115, and outside of the jacket 116 of the housing there is provided an annular collector space 117. Between receptacle 115 and collector space 117, there are provided numerous pipes 118. The heat-exchange system, consisting of the individual parts 115, 118, and 117, connected with each other in a liquid-tight manner, is connected, for example, by means of suitable pipe connections 119, with a cooling agent line. In connection with the leading away of heat of reaction, one may, however, also operate with a vaporizing cooling agent which is present in receptacle 115 and is continuously drawn off by a suction pump which acts on pipe connection 119.

Pipe lines 118 form the exchange surfaces with which the material to be treated and the treating gases must come into intensive contact. These pipe lines may be of arc or spiral shape. Preferably, they are arranged in such a manner that the mutual distance between the outer pipe surfaces is the same at all points, so that a uniform heat exchange can take place everywhere with the quantities of material passing through the treatment gases blown through.

In addition, the process in accordance with the invention may be employed for the dusting of granular materials used, for example, when deliquescent salts or artificial fertilizers are to be provided with a protective covering. Furthermore, similar to the dusting of granular material, the dusting material may be suspended in dust form directly in the gas current entering the apparatus, or the dusting may be effected by means of an auxiliary gas current which is charged with the dusting material. Similar to the dusting of granular material passing continuously through the apparatus, in accordance with the invention, there may also be effected a removal of dust from gases. In this instance, a dust-laden gas or air to be freed from some undesired suspended substance, is introduced into the treating vessel. As the granular material, a substance or mixture of substances, is employed, which, due to its physical-chemical nature, intensively absorbs and holds the impurities which are to be removed from the gas to be cleaned. Furthermore, the granular material used in cleaning dust from gases leaves the treating vessel and is led to a cleaning device, which may consist, for example, of a washing or dust-removing device. Here the impurities filtered out of the gas flow are removed from the granular material, and the purified granular material is thereupon able to be returned into the treating vessel and may be again used for removing dust from gas.

If wet masses are to be discharged by means of air or other gases, a partial evaporation of the quantity of water or other liquid solvent present in the mass to be treated takes place, particularly in the upper part of the layer of material, inasmuch as the treating gases have at this point approximately assumed the temperature of the hot entering material.

Such a decrease in the moisture content of the material is undesirable if the cooled material is to retain a given moisture content. A non-permissible decrease of the moisture content of the material may easily be eliminated, in the method according to the present invention, by moistening the material, before its entrance into the cooling device with liquid, in particular, with water or easily vaporized liquids. This moistening may also be effected by mixing or spraying. In this way, there is obtained an additional cooling effect, inasmuch as the water or solvent added produces increased possibilities of evaporation. The quantity of vaporizable liquid added depends on the cooling action desired and the final moisture content intended.

The method of previously moistening the material to be cooled may, for example, be advantageously utilized when treating extracted oil seeds which leave an extractor in a heated condition and must be cooled, for example, from a temperature of 60–100° C. to room temperature. Oil seeds, after their extraction, contain, for example, 5–10% water. In connection with the cooling in accordance with the present invention, a loss of water of approximately 1% $H_2O$ occurs. Prior to the cooling, therefore, enough water is added to the oil seeds that, taking into consideration the increased water evaporation, the cooled seeds show the customary, or, possibly, even an increased, moisture content. In addition, other hot substances, such as water-containing salts, fertilizers, minerals and ores, the water content of which in cooled condition is to be of a given value, may be very advantageously cooled in accordance with the present invention by prior spraying or trickling with water or other solvents. Gasoline, trichloroethylene or ether are, for example, suitable solvents.

It has further been found that extraordinary uniformity in the continuous treatment of granular materials with gases is possible if the granular material is passed out of the treating device through a discharge opening, the width or cross-sectional area of passage of which is variable and may be adjusted. In this manner it is possible to maintain the height or thickness of the layer of solid material at least 200 mm. in height and preferably 300–400 mm. in height.

Various devices for maintaining a constant layer height of at least 200 mm. in the material to be treated are shown in Figs. 11–19.

Referring to Figs. 11–19, 201 is a casing, container, chamber, or compartment, and 206 is the gas entrance. 202 is the apertured treating bottom. The gases passing through the granular mass descending on to this bottom escape through an exhaust opening 207 in the upper part of the casing or container. 203 is the entrance for the granular material, which material, after treatment, passes through the discharge opening 204, whose cross-sectional area of passage is controlled by a movable throttle 205.

The throttle member controls and regulates the outflow of the material under treatment. It can be controlled and adjusted in its turn by various impulses and preferably by the weight of the solid material supported on the treating bottom, by the pressure the material exerts thereon, or by the damming pressure acting on the gas and created by the layer of solid material at a predetermined weight of the piled-up material. Also, a combination of the weight or pressure of the solid material with the gas-damming pressure may be utilized in controlling the position of the throttle.

The transmission of the regulating impulses to throttle 205 to be actuated in the discharge opening 204 may be effected either directly by mechanical means, or with the aid of an auxiliary force, as, for example, compressed air or oil under pressure, an electrical force, optical switching devices, and the like.

In Fig. 11, the intake and exhaust openings for the gas, as well as for the solid material to be treated, are disposed laterally on opposite walls of the container surrounding the bottom. The solid material enters at the top right and escapes at the left bottom, and the gas enters at the right bottom, and, after rising through the solid material, escapes at the left top. Treating bottom 202 is hinged to the right-hand wall at 208 and rests on a spring at 209, and, in proportion as the height of the layer of solid material varies, the bottom 202 will pivot on its hinge in correspondence with the changes of compression of the spring 209. A link such as 210 hinged to the treating bottom 202 and to a pivot or throttle 205 transmits the bottom movements to the throttle in such a manner that the cross-sectional area of passage of the discharge opening 204 is increased whenever the height of the layer on the bottom 202 rises and decreases when the height of the layer on the bottom 202 falls.

The desired mean layer height of the material is adjusted by a corresponding adjustment of the spring 209. The value to which the layer height should be adjusted depends upon the rate of contacting and gas flow velocity. The spring may, of course, be replaced by a counterweight acting on a lever arm of constant or adjustable length.

While in the apparatus shown in Fig. 11, the discharge of the solid material under treatment is controlled in a purely mechanical manner in dependence upon the pressure exerted by the material on the intermediate bottom, this control may also be effected by means of an auxiliary force, as, for example, by compressed air, as shown in Fig. 12. In this embodiment, the spring-supported treating bottom 202 acts on a throttle valve 211, which opens a path permitting compressed air supplied through pipe 212 to enter whenever the weight of the solid material acting on the bottom is lessened. The compressed air acts on the pliable membrane 214, which, in moving against the action of spring 213, closes throttle 205 arranged in the discharge opening. Whenever the desired height of the layer of solid material is exceeded, the valve 211 shuts off the compressed air supply and opens aperture 211a, allowing the compressed air, which is still acting on the membrane, to escape, so that the membrane may move in the opposite direction and open throttle 205.

In order to avoid friction created by oscillatable treating bottom and the material contacting the container walls, bottom 202a in Fig. 13 forms part of an open container 201a. 202a is shaped in the form of a stepped grate, and is supported on springs 209 for free movement in the closed outer casing 215. The solid material drops through a center opening 203 in the outer casing 215 onto a distributing tray 216, and is discharged through a central opening 204. In this case the gas enters through intake 206 of the outer casing 215, and escapes at 207. According to the height of the layer of solid material in the inner container 201a, container 201a varies its position relative to the outer casing 215, and thereby controls the cross-sectional area of passage of the discharge opening 204 relative to valve body 217a suspended from tray 216 by means of rod 217. As grate 202a drops lower, the cross-sectional area of passage between 202a and valve body 217a becomes larger. This mechanical control means may be combined with an auxiliary force, such as compressed air or oil under pressure, which serves to transmit motion.

Fig. 14 shows an embodiment having a stationary treating bottom 202 and means for actuating throttle 205 in the discharge opening by means of the damming pressure opposed to the rising gas by the layer of solid material, which, if the particle size of the granular material remains constant, depends upon the height of the layer. This pressure acts underneath the treating bottom on membrane 218, which rests against spring 219, which in turn is imparted a pre-tension in accordance with the desired layer height of material. The position of membrane 218 depends upon the ratio existing between the gas-damming pressure and the spring pressure. This membrane is utilized for the operation of throttle valve 211a, which permits compressed air from supply pipe 212 to act on membrane 214, which is acted upon by spring 213a, and which controls the position of throttle 205. The compartment containing membrane 218 is cleaned of dust by means of auxiliary conduit 223, which leads to the top of container 201. Here also the transmission of the gas-pressure differences on throttle 205 may be assisted by auxiliary forces.

Difficulties may arise in the operation of the devices shown in Figs. 11–14 if the properties of the solid material under treatment, and more particularly the dynamic pouring weight of this material, undergoes material variations. The control of the quantity of solid material discharged through discharge opening 204 by means of the weight acting on the treating bottom is influenced by the fact that it corresponds to the difference between the weight of the material and the damming pressure opposed to the gas. With a constant layer height, the damming pressure does not rise in linear proportion, but rather rises more rapidly than the weight, and with the pouring weight rising, the pressure exerted by it on the bottom may become lower and may even drop to zero. In that case, if the spring has been imparted a predetermined tension, the layer height of material may become higher than desired. If the throttle 205 is controlled by the damming pressure of the gas, as, for example, in the manner illustrated in Fig. 14, a rise of the pouring weight may cause a change in the damming pressure to such an extent that, if a predetermined constant damming pressure is maintained, the height of the layer of material will drop to a greater extent than the required drop which corresponds to the increase in pouring weight. This would result in an unduly low layer of granular material resting on the intermediate bottom.

These difficulties in the regulation of layer height of a material, the pouring weight of which undergoes considerable variations, may be avoided if the movable support of the weight of the material is freed from the disturbing influence of the damming pressure, which depends upon the granular material filling the apparatus.

Figs. 15, 16, and 17 illustrate devices in which the above-mentioned difficulties are avoided. The embodiments of Figs. 15 and 16 are substantially similar to Fig. 11 with the exception that instead of the treating bottom, the entire device, including outer casing 201b, is supported for pivotal movement about bearing 208b. On the other side casing 201b is supported by spring 209b (Fig. 15) or blade 220 acting on counter-weighted lever 220b. In both cases, a lever system 230 hinged to a fixed point 231 influences the position of throttle 205 when the apparatus tilts around its bearing 208b.

Fig. 17 shows an embodiment similar to Fig. 13, the cross-sectional area of the discharge opening being again controlled by a conical valve body 217c which is suspended from a distributing tray 225. The entire device is supported by springs 209c. By displacing itself against the valve body, the device changes the cross-sectional area of passage of the discharge opening.

In this embodiment, as well as those shown in Figs. 15 and 16, the treating bottom may only participate with a portion of the outer casing 201b in the control movement, as, for example, the bottom portion and the gas-feed compartment.

Fig. 18 illustrates a device for regulation of the operation which is solely dependent upon the weight of granular material in the device, and, therefore, works satisfactorily, even if the pouring weight varies. A spring-controlled membrane or manometric cell 221 is arranged in the bottom section of the container. This membrane or cell is acted upon by both the damming pressure and the static pressure of the solid material. Below the membrane, the outer pressure or the pressure above the layer of the material acts. The forces acting on the membrane corresponding to the layer of solid material travelling on and above the treating bottom. They displace membrane 221 in accordance with the preliminary tension of the spring below it. The membrane 221 acts on throttle valve 211, which admits compressed air from pipe 212, or conversely shuts off compressed air from pipe 212. The compressed air acts upon another membrane 214, which is also acted upon by spring 213, and this membrane (214) controls throttle 205 in a manner similar to that shown in the device shown in Fig. 12.

Another means of maintaining a predetermined layer height is the arrangement of contacts, manometric cells, optical indicating devices, or the like, at different levels on the wall or container 201. These various devices will vary the position of the throttle or other control element in the discharge opening at a predetermined layer height.

As regards this throttle, it is important that resistance to movement, which is influenced by the material above it, be as low as possible. This may be provided for by baffles 222 arranged above the discharge opening as shown in Fig. 19.

The method in accordance with the instant invention may be modified in various different ways without going beyond the scope of the generic concept of the invention.

We claim:

1. Method of treating granular materials with gases, which comprises continuously passing such material in a coherent mass down at least one substantially inclined path within an enclosed treatment zone, the angle of slope of said inclined path being smaller than the angle of repose of such material, maintaining a layer height of such material of at least 200 mm. above said path, and continuously passing an upwardly-directed flow of treating gas into contact with said material at a velocity sufficient to partially decrease the downward pressure of said material by at least 50%, and being insufficient to suspend such material.

2. Method according to claim 1, in which the layer height of said material along said inclined path is controlled by the pressure of the treating gas as it passes through the material.

3. Method according to claim 1, in which the layer height of said material along said inclined path is controlled by the pressure caused by the weight of the material.

4. Method according to claim 1, in which the layer height of said material along said inclined path is controlled by the pressure of the treating gas as it passes through the material and the pressure caused by the weight of the material.

5. Method according to claim 1, in which the material is moistened prior to being passed down said inclined path.

6. Method according to claim 1, in which said treating gas is charged with a dusting agent.

7. Method according to claim 6, in which said dusting agent is suspended in dust form in a current of cooling air.

8. Method according to claim 1, in which said treating gas is a gas containing impurities, and said material is a material for removing said impurities.

9. Method according to claim 8, in which such granular material is freed from said impurities after passage down said inclined path, and thereafter re-passed down said inclined path.

10. Method according to claim 1, in which such material is passed down at least one first and at least one second inclined path, said first inclined path being a substantially conical path and said second inclined path being substantially a funnel-shaped path.

11. Method according to claim 1, which includes maintaining said layer height of at least 200 mm. above said path by using the damming pressure acting on said treating gas during its ascent through said material to influence the cross-sectional area of passage of a discharge zone, whereby the layer height of said material is maintained substantially constant.

12. Method according to claim 11, in which said granular material is hot granular material to be cooled, and which includes maintaining a thickness in vertical direction of the body of material passing down said inclined path sufficient to heat said gas in contact with said material substantially to the temperature of the fresh material being passed down said path.

13. Method according to claim 11, in which said granular material is hot granular material to be cooled, and which includes maintaining the moisture content of said gas as it escapes from hot granular material substantially at a hygroscopic equilibrium with the moisture content of said material as it is passed to said inclined path.

14. Method according to claim 1, in which said layer height is between 300 and 400 mm.

15. Apparatus for continuously treating granular material with a gas, comprising in combination a casing, an inclined open-work treating floor in said casing, means above said floor for directing an uninterrupted flow of granular material on to the uppermost part of said floor, means below said floor for continuously feeding gas through said floor and through the body of material travelling down said floor, discharge means for the treated material at the lower end of said floor, means for varying the cross-sectional area of passage of said discharge means, and gas-pressure-responsive means adapted to influence said area of passage-varying means.

16. Apparatus according to claim 15, in which the inclined treating floor is hingedly supported and which includes a source of compressed fluid connected with said floor, a valve controlling the fluid supply and in its turn controlled by movements of said floor, a spring-controlled diaphragm exposed to pressure impulses from said compressed fluid, and an operative connection between said diaphragm and said passage-varying means.

17. Apparatus according to claim 15, in which pneumatic means are provided to control a height of the layer of material on the treating floor, said means comprising a plate horizontally arranged beneath and in contact with said layer, a spring supporting said plate for vertical displacement, a membrane influenced by said spring, a source of compressed fluid operatively connected with said membrane, and a valve inserted in said connection, said membrane being operatively connected with the passage-varying means.

References Cited in the file of this patent

UNITED STATES PATENTS

| | | |
|---|---|---|
| 271,604 | Cook | Feb. 6, 1883 |
| 1,551,965 | Muller | Sept. 1, 1925 |
| 1,702,311 | Pantenburg | Feb. 19, 1929 |
| 1,958,291 | Woodruff et al. | May 8, 1934 |
| 2,084,976 | Puerner | June 22, 1937 |
| 2,270,903 | Rudbach | Jan. 27, 1942 |
| 2,316,664 | Brassert et al. | Apr. 13, 1943 |
| 2,501,487 | Whitman | Mar. 21, 1950 |
| 2,513,369 | Shaw | July 4, 1950 |
| 2,532,335 | Royster | Dec. 5, 1950 |
| 2,536,099 | Schleicher | Jan. 2, 1951 |
| 2,544,616 | Sartorius | Mar. 6, 1951 |
| 2,677,604 | Nelson | May 4, 1954 |

FOREIGN PATENTS

| | | |
|---|---|---|
| 566,331 | Germany | Dec. 16, 1932 |

OTHER REFERENCES

Industrial and Engineering Chemistry, vol. 41, #6, June 1949, pp. 1247 to 1249.